United States Patent [19]
Sasaki et al.

[11] Patent Number: 5,471,203
[45] Date of Patent: Nov. 28, 1995

[54] ADMISSION MANAGING SYSTEM

[75] Inventors: Michiyuki Sasaki; Kenji Suzuki, both of Sendai; Kenji Morosawa, Kawasaki; Toshimitsu Ohba, Kawasaki; Tooru Kadonaga, Kawasaki, all of Japan

[73] Assignee: Fujitsu Limited, Kanagawa, Japan

[21] Appl. No.: 383,604

[22] Filed: Feb. 1, 1995

Related U.S. Application Data

[63] Continuation of Ser. No. 975,092, Nov. 12, 1992, abandoned.

[30] Foreign Application Priority Data

Nov. 14, 1991 [JP] Japan ................... 3-299087

[51] Int. Cl.⁶ ............... H04Q 9/00; G08B 23/00; G06F 7/04
[52] U.S. Cl. ............... 340/825.31; 340/825.54; 340/572; 235/382
[58] Field of Search .......... 340/825.31, 825.32, 340/825.34, 572, 825.54, 825.49, 825.65, 825.72; 235/375, 376, 377, 382, 382.5; 371/67.1, 69.1

[56] References Cited

U.S. PATENT DOCUMENTS

| | | | |
|---|---|---|---|
| 3,891,980 | 6/1975 | Lewis et al. | 340/825.31 |
| 3,953,769 | 4/1976 | Sopko | 340/825.31 |
| 3,973,242 | 8/1976 | Field et al. | 340/825.65 |
| 4,325,146 | 4/1982 | Lennington | 340/825.54 |
| 4,471,345 | 9/1984 | Barrett, Jr. . | |
| 4,473,825 | 9/1984 | Walton . | |
| 4,598,275 | 7/1986 | Ross et al. | 340/825.31 |
| 4,670,746 | 6/1987 | Taniguchi et al. | 340/825.31 |
| 4,822,990 | 4/1989 | Tamada et al. | 340/825.31 |
| 4,864,292 | 9/1989 | Nieuwkoop | 340/825.31 |
| 5,021,778 | 6/1991 | Walton | 340/825.54 |
| 5,157,247 | 10/1992 | Takahira | 235/382 |
| 5,204,663 | 4/1993 | Lee | 340/825.34 |

FOREIGN PATENT DOCUMENTS

| | | |
|---|---|---|
| 0108643 | 5/1984 | European Pat. Off. . |
| 0427342 | 5/1991 | European Pat. Off. . |
| 57394 | 3/1986 | Japan . |
| 26573 | 2/1987 | Japan . |
| 273979 | 11/1988 | Japan . |
| 302487 | 12/1989 | Japan . |
| 278394 | 11/1990 | Japan . |
| 287783 | 11/1990 | Japan . |
| 287782 | 11/1990 | Japan . |
| 302889 | 12/1990 | Japan . |
| 62292 | 3/1991 | Japan . |
| 81890 | 4/1991 | Japan . |
| 80398 | 4/1991 | Japan . |
| 23092 | 1/1992 | Japan . |

Primary Examiner—Alyssa H. Bowler
Assistant Examiner—Mark H. Rinehart

[57] ABSTRACT

An admission managing system manages admission of a card holder of an integrated circuit card which has a part for operating by a power induced by an external command, a memory for storing identification information and a part for at least communicating in a non-contact manner including reception of the command and transmission of the identification information. The admission managing system includes a gate for admitting the card holder of the integrated circuit card when opened, a first part for transmitting the command and for receiving the identification information received from the integrated circuit card in response to the command, a second part for storing identification information of authorized card holders to be admitted, a third part for opening the gate when the identification information received by the first part from the integrated circuit card is identical to one of the identification information stored in the second part, and a fourth part for outputting a warning to the card holder if a number of times the same identification information is received by the first part from the integrated circuit card exceeds a predetermined value.

10 Claims, 5 Drawing Sheets

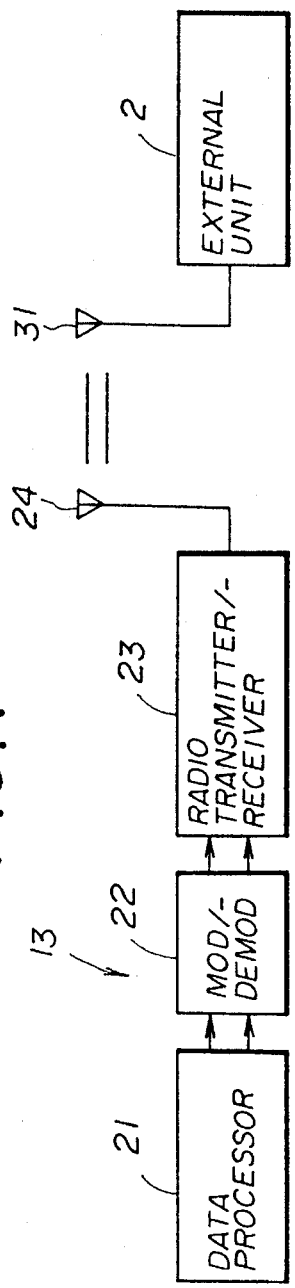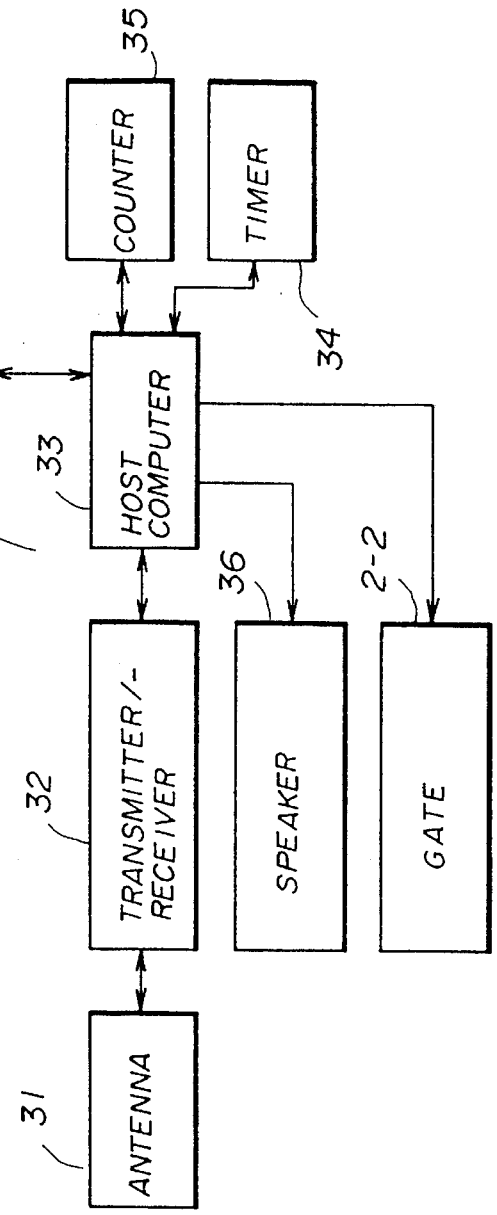

ADMISSION MANAGING SYSTEM

This is continuation, of application Ser. No. 07/975,092, filed Nov. 12, 1992, now abandoned.

BACKGROUND OF THE INVENTION

The present invention generally relates to admission managing systems, and more particularly to an admission managing system for admitting authorized people into a place of meeting or the like.

In an admission managing system which admits only authorized people into a place of meeting such as university grounds and a meeting hall, each person shows his identification (ID) card which shows his personal identification information. The person is admitted into the place of meeting after it is confirmed that he is one of the authorized people.

However, this method was troublesome and a burden on each authorized person, because he must show his ID card every time he wishes to enter the place of meeting.

In order to eliminate this problem, the use of an integrated circuit (IC) card which stores the ID information of the holder of the IC card has been proposed. The IC card is provided with a memory which stores the ID information and a central processing unit (CPU). The ID information is input to the CPU of the IC card from an external unit via electrode terminals of the IC card, so that this input ID information can be collated with the ID information stored in the memory of the IC card. In addition, it is also possible to rewrite the contents of the memory of the IC card from the external unit. The IC card has a relatively large memory capacity, and the information privacy of the IC card is satisfactory.

However, because the electrode terminals of the IC card must make contact with the external unit such as a card reader in order to exchange information, it was troublesome for the card holder to use the IC card.

In order to eliminate this problem of the IC card and make the card more convenient, a non-contact type IC card has been proposed. The non-contact type IC card is provided with a transponder having an oscillator circuit, an oscillation control circuit and the like which are provided on an IC card body, and information is exchanged between the external unit via the transponder. For example, electromagnetic waves, high-frequency waves, radio frequency (RF) waves, light, electrostatic coupling and the like are used as a data transmission medium, and the ID information is written into and read out from the memory within the non-contact type IC card.

In the case where a microwave is used as the data transmission medium, the ID information is transmitted from the non-contact type IC card in the form of the microwave and received by a terminal equipment which is provided at the entrance. The terminal equipment collates the received ID information with the ID information which is registered for each authorized person, and opens the gate to admit the authorized person into the place of meeting only if the two collated ID information match. As a result, there is an advantage in that the card holder does not need to insert the non-contact type IC card into the card reader, and it is convenient because the card holder may simply keep the non-contact type IC card in his pocket, for example.

However, the conventional non-contact type IC card suffers from the following problem. That is, if a card holder carrying the non-contact type IC card approaches near the terminal equipment, the non-contact type IC card is operated by its own battery in response to an inquiry radio wave which is output from the terminal equipment. Hence, if the card holder stands near the gate for a relatively long time before passing through the gate, the ID information which is returned from the non-contact type IC card is consecutively read by the terminal equipment a plurality of times. For this reason, there was a problem in that the battery of the non-contact type IC card wears out quickly because the terminal equipment operates the non-contact type IC card a plurality of times while the card holder stays near the gate.

SUMMARY OF THE INVENTION

Accordingly, it is a general object of the present invention to provide a novel and useful admission managing system in which the problem described above is eliminated.

Another and more specific object of the present invention is to provide an admission managing system for admitting a card holder of an integrated circuit card which has means for operating by a power induced by an external command, a memory for storing identification information and means for at least communicating in a non-contact manner including reception of the command and transmission of the identification information, comprising a gate for admitting the card holder of the integrated circuit card when opened, first means for transmitting the command and for receiving the identification information received from the integrated circuit card in response to the command, second means, coupled to the first means, for storing identification information of authorized card holders to be admitted, third means, coupled to the first and second means, for opening the gate when the identification information received by the first means from the integrated circuit card is identical to one of the identification information stored in the second means, and fourth means, coupled to the first means, for outputting a warning to the card holder if a number of times the same identification information is received by the first means from the integrated circuit card exceeds a predetermined value. According to the admission managing system of the present invention, the number of times the same ID information is received is counted and the warning is output to the card holder if the counted number exceeds the predetermined value. Hence, the card holder will most likely move away from the gate when warned, and thus, it is possible to minimize the wear of the battery of the IC card.

Other objects and further features of the present invention will be apparent from the following detailed description when read in conjunction with the accompanying drawings.

BRIEF DESCRIPTION OF THE DRAWINGS

FIG. 4 is a system block diagram showing parts of a non-contact type communication part of the composite IC card and an external unit for explaining a communication therebetween;

FIG. 5 is a system block diagram showing an embodiment of the external unit;

DESCRIPTION OF THE PREFERRED EMBODIMENTS

First, a description will be given of the operating principle of the present invention, by referring to FIG. 1.

Figure 1:
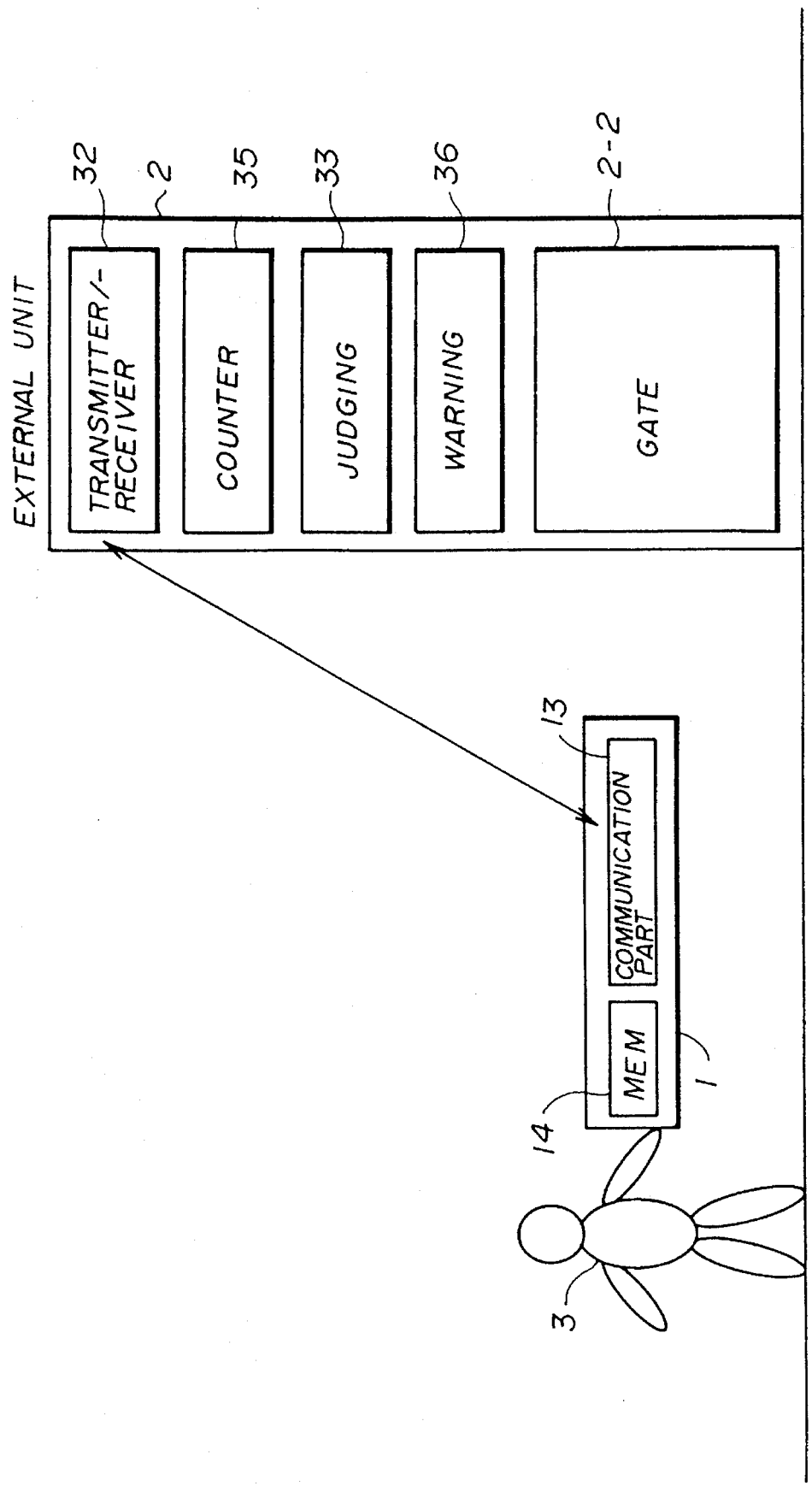
FIG. 1 is a diagram for explaining the operating principle of the present invention.

In FIG. 1, an IC card 1 includes a memory 14 for storing ID information, and a non-contact type communication Dart 13 which transmits the ID information from the memory 14 in a non-contact manner by operating in response to a power induced by an external command. On the other hand, an external unit 2 includes a gate 2—2 for passing an authorized card holder 3 carrying the IC card 1. The external unit 2 collates the ID information transmitted from the IC card 1 with the registered ID information, and opens the gate 2—2 to admit the card holder 3 only if the two collated ID information match.

The external unit 2 is additionally provided with a transmitter/receiver 32 for transmitting the command and for receiving the ID information which is transmitted from the IC card 1 in response to the command, a counter 35 for counting the number of times the same ID information is received when the card holder 3 passes the gate 2—2 if the transmitter/receiver 32 receives the same ID information from the IC card 1 a plurality of times, a judging means 33 for judging whether or not the number of same ID information counted by the counter 35 exceeds a predetermined value, and a warning means 36 for outputting a warning to indicate that the same ID information is read a plurality of times when the judging means 33 judges that the counted number exceeds the predetermined value.

Preferably, a timer 34 (not shown in FIG. 1 but shown in FIG. 5) which will be described later is provided in the external unit 2. The timer 34 is started when the ID information from the IC card 1 is first read by the external unit 2, and stops after a predetermined time, so that the external unit 2 may disregard the same ID information and stop the warning means 36 if this same ID information is successively received over this predetermined time.

For example, the warning means 36 may give a warning to the card holder 3 to indicate that the same ID information is read a plurality of times, by sounding a buzzer.

According to the present invention, when the card holder 3 stands near the gate 2—2 for a relatively long time, the transmitter/receiver 32 transmits the command a plurality of times. Hence, the IC card 1 continues to operate by the power of a battery thereof in response to each command. Accordingly, the transmitter/receiver 32 receives the same ID information transmitted from the IC card 1 a plurality of times.

In this case, the counter 35 counts the number of times the same ID information is received, and the judging means 33 judges whether or not the counted number exceeds the predetermined value. If the counted number exceeds the predetermined value, the warning means 36 warns the card holder 3 by indicating that the same ID information is read a plurality of times. The card holder 3 will move away from the gate 2—2 when warned, and thus, it is possible to minimize the wear of the battery of the IC card 1.

If the timer 34 is provided, the redundant reading of the same ID information transmitted from the IC card 1 can be avoided by disabling the reception of the ID information after the timer 34 times the predetermined time, so that the warning will not continue indefinitely.

Furthermore, if the warning means 36 sounds the buzzer, it is easier for the card holder 3 to recognize that he should move away from the gate 2—2. Therefore, it is possible to more positively minimize unnecessary wear of the battery of the IC card 1.

Of course, the warning means 36 may use means other than the buzzer to give the warning, such as turning ON or flashing a warning lamp.

Figure 2:
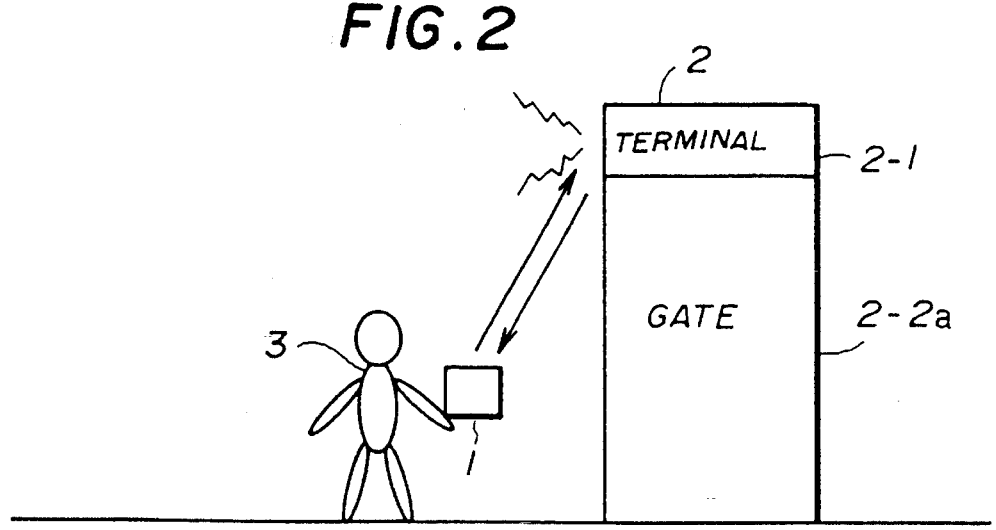
FIG. 2 is a diagram for explaining an embodiment of an admission managing system according to the present invention.

Next, a description will be given of an embodiment of an admission managing system according to the present invention, by referring to FIG. 2. In FIG. 2 and figures which follow, those parts which are the same as those corresponding parts in FIG. 1 are designated by the same reference numerals.

The admission managing system shown in FIG. 2 includes the IC card 1 which is carried by the card holder 3, and the external unit 2 which includes a terminal equipment 2-1 and a gate 2–2a. The terminal equipment 2-1 collates the ID information which is transmitted from the IC card 1 with the registered ID information of each authorized card holder. The gate 2–2a is opened to admit the card holder 3 into the place of meeting if the two collated ID information collated in the terminal equipment 2-1 match.

In addition, if the card holder 3 stands near the gate 2–2a for a relatively long time and the same ID information is read by the terminal equipment 2-1 a plurality of times, the terminal equipment 2-1 warns the card holder 3 by an alarm sound or the like to indicate that the same ED information is read a plurality of times and to suggest that the card holder 3 move away from the gate 2–2a.

Figure 3:
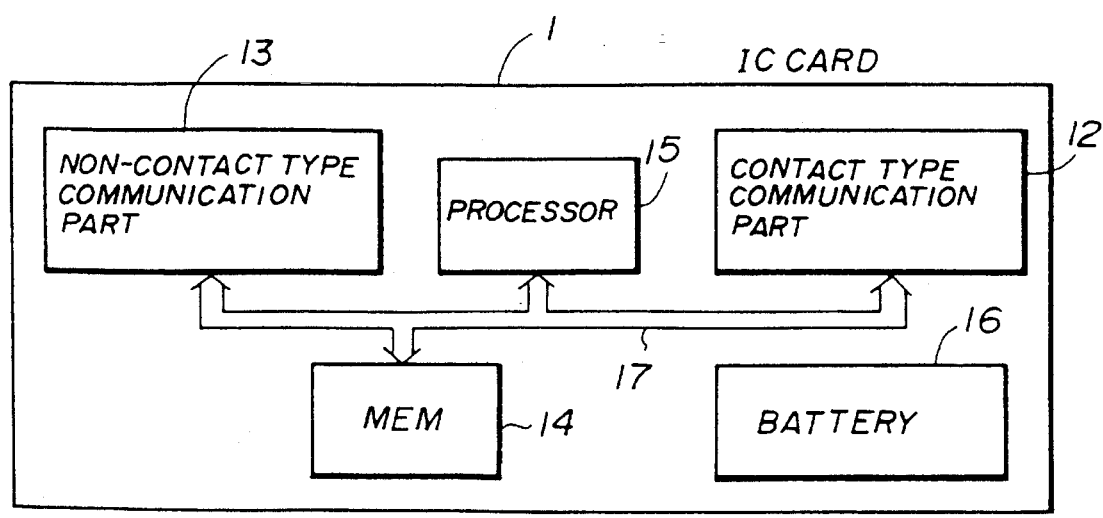
FIG. 3 is a system block diagram showing an embodiment of a composite IC card.

The IC card 1 used in this embodiment may have a composite construction shown in FIG. 3. The IC card 1 shown in FIG. 3 has a shape similar to a regular credit card and includes electrode terminals (not shown), a contact type communication part 12, a non-contact type communication part 13, a memory 14 and a processor 15 which are coupled via a data bus 17.

The electrode terminals 11 for making electrical contact with the external unit 2 are provided on a top surface of the IC card 1. The contact type communication part 12 makes a data communication with the external unit 2 via the electrode terminals when the electrode terminals make contact with contact pins of an IC card reader/writer (not shown) of the external unit 2, for example. The data from the IC card reader/writer is written into the memory 14 of the IC card 1 via the contact pins of the IC card reader/writer, the electrode terminals, the contact type communication part 12 and the processor 15. It is also possible to read the data from the memory 14 by the IC card reader/writer..

The composite IC card 1 shown in FIG. 3 is provided with the contact type communication part 12 and the non-contact type communication part 13. Thus, the contact type communication part 12 and the non-contact type communication part 13 can be used selectively depending on the construction of the external unit 2. For this reason, it is extremely convenient for the card holder 3 in that the card holder 3 can cope with two kinds of card systems using a single composite IC card 1.

The non-contact type communication part 13 communicates with the external unit 2 in a non-contact manner using a transmission medium such as electromagnetic waves, light, electrostatic coupling, and magnetic field. In this case, the transmission medium is electromagnetic waves and microwaves in particular.

The memory 14 is used for storing the data and may be a read only memory (ROM) and/or a random access memory (RAM).

The processor 15 processes the data which is exchanged between the IC card 1 and the external unit 2. Furthermore, the processor 15 controls the data communication which is made between the memory 14 and the external unit 2 via the non-contact type communication part 13.

The battery 16 is made up of a sheet battery, for example. In a standby mode, the current consumption of the battery 16 is on the order of several µA, and is operated in response to the command from the external unit 2. For example, the operating current of the battery 16 is several mA, and this operating current is supplied to the various parts of the IC card 1.

Of course, the IC card 1 used in this embodiment is not limited to the composite IC card 1 shown in FIG. 3. The IC card 1 which is used in this embodiment should at least be provided with the means necessary for carrying out the communication with the external unit 2 in the non-contact manner, and the means for carrying out the communication by making contact with the IC card reader/writer is not essential.

FIG. 4 is a system block diagram for explaining the communication between the non-contact type communication part 13 of the IC card 1 and the external unit 2. The non-contact type communication part 13 shown uses the radio wave as the transmission medium, and includes a data processor 21, a modulator/demodulator (modem) 22, and a radio transmitter/receiver 23.

The data processor 21 carries out a signal processing on an output of the processor 15 or the modem 22. The modem 22 modulates an output of the data processor 21 by a radio signal (carrier wave signal), and demodulates an output of the radio transmitter/receiver 23 by the radio signal (carrier wave signal). For example, the radio carrier wave signal is a microwave, and it is desirable that the frequency is in the range of 1 to 2 GHz. The radio transmitter/receiver 23 transmits the output of the modem 22 via an antenna 24 towards an antenna 31 of the external unit 2. The radio transmitter/receiver 23 also receives a signal from the antenna 31 via the antenna 24.

For example, when transmitting the ID information from the non-contact type communication part 13 to the external unit 2, the data processed by the data processor 21 is modulated in the modem 22, and the modulated data is transmitted from the radio transmitter/receiver 23 to the external unit 2 via the antenna 24.

FIG. 5 shows an embodiment of the construction of the external unit 2. The external unit 2 shown in FIG. 5 includes the antenna 31, the transmitter/receiver 32, a host computer 33, the timer 34, the counter 35, a speaker 36, a memory 37, and the gate 2—2.

The antenna 31 transmits the command with respect to the antenna 24 of the IC card 1 under the control of the host computer 33. The antenna 31 also receives the electromagnetic wave output from the antenna 24 of the IC card 1 in response to the command, and the radio signal including the ID information is output to the transmitter/receiver 32. The transmitter/receiver 32 demodulates the radio signal including the ID information using the radio carrier wave signal, and outputs the ID information to the host computer 33.

The host computer 33 collates the ID information from the transmitter/receiver 32 with the ID information of each authorized card holder registered in the memory 37. The host computer 33 operates to open the gate 2—2 only if the two collated ID information match. The card holder 3 is admitted to the place of meeting or the like when the gate 2—2 opens.

On the other hand, the timer 34, the counter 35 and the speaker 36 are coupled to the host computer 33. The counter 35 counts the number of times the same ID information is read by the host computer 33. The host computer 33 reads the same ID number a plurality of times if the card holder 3 stands near the gate 2—2 for a relatively long time and the IC card 1 carried by this card holder 3 repeatedly sends the ID information in response to the commands successively received from the external unit 2.

The host computer 33 judges whether or not the counted value of the counter 35 exceeds a predetermined value, and outputs an alarm signal to the speaker 36 if the predetermined value is exceeded. This predetermined value may be set in advance by the user of the external unit 2. The speaker 36 outputs an alarm sound (buzzer sound) in response to the alarm signal, so as to indicate to the card holder 3 that the same ID information is received a plurality of times.

The timer 34 is used to manage a predetermined time which may be set in advance by the user of the external unit 2. This timer 34 is started when the host computer 33 first receives the ID information from the IC card 1. If the host computer 33 receives the same ID information for over this predetermined time timed by the timer 34, the host computer 33 disregards the same ID information and accordingly stops outputting the alarm signal to the speaker 36.

Figure 6:
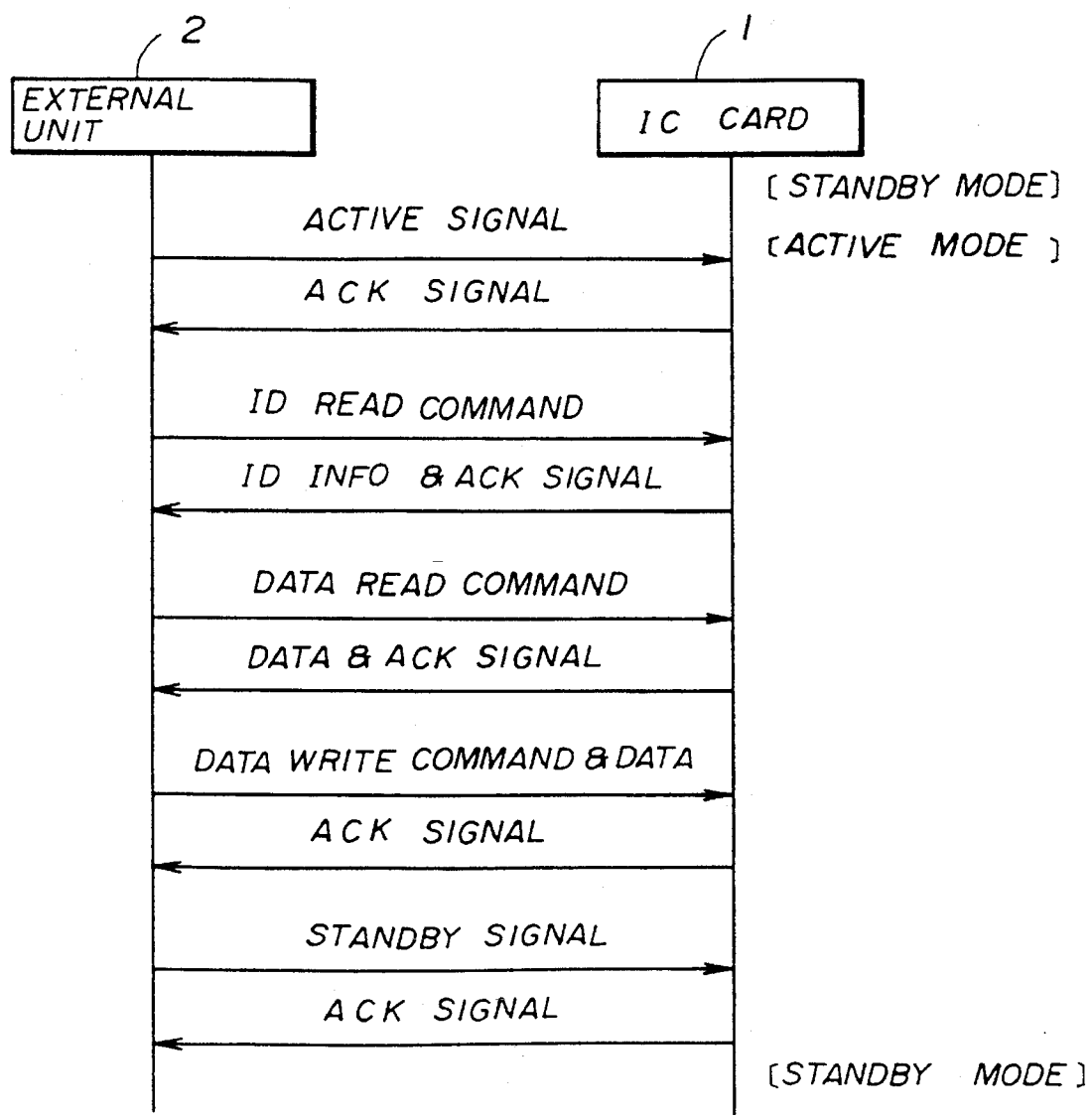
FIG. 6 is a sequence diagram for explaining a communication between the external unit and the composite IC card.

FIG. 6 is a sequence diagram for explaining the communication between the external unit 2 and the IC card 1.

The status mode of the IC card 1 includes a standby mode and an active mode. It is assumed for the sake of convenience that the IC card 1 is initially in the standby mode as shown in FIG. 6. In the standby mode, the IC card 1 operates only those circuits of the IC card 1 necessary to receive an active signal from the external unit 1. In other words, the IC card 1 operates under a low current consumption in the standby mode.

When the active signal is transmitted from the external unit 2 to switch the status mode of the IC card 1 from the standby mode to the active mode, the IC card 1 receives the active signal and the data transmission/reception operation of the IC card 1 is enabled. In addition, the IC card 1 transmits an acknowledge (ACK) signal to indicate that the command from the external unit 2 has been executed, that is, the active signal has been received.

Next, the external unit 2 transmits an ID read command to the IC card 1. This ID read command is used to read the ID number which is stored in the memory 14 of the IC card 1. In response to this ID read command received from the external unit 2, the IC card 1 transmits an ACK signal and the ID information to the external unit 2. This ACK signal indicates that the ID read command has been executed. The external unit 2 transmits a data read command, and in response thereto, the IC card 1 transmits the data and the ACK signal, as shown in FIG. 6.

In addition, the external unit 2 transmits a data write command and data to the IC card 1. This data write command is used to write the data into the memory 14 of the IC card 1. In response to this data write command and the data received from the external unit 2, the processor 15 of the IC card 1 writes the received data into the memory 14, and transmits an ACK signal to the external unit 2. This ACK signal indicates that the data write command has been executed.

Furthermore, the external unit 2 transmits a standby signal to the IC card 1 to switch the status mode of the IC card 1 from the active mode to the standby mode. The status mode of the IC card 1 is switched to the stand by mode in response to the standby signal, and the IC card 1 transmits an ACK signal to the external unit 2 to indicate that the command from the external unit 2 has been executed, that is, the standby signal has been received.

Figure 7:
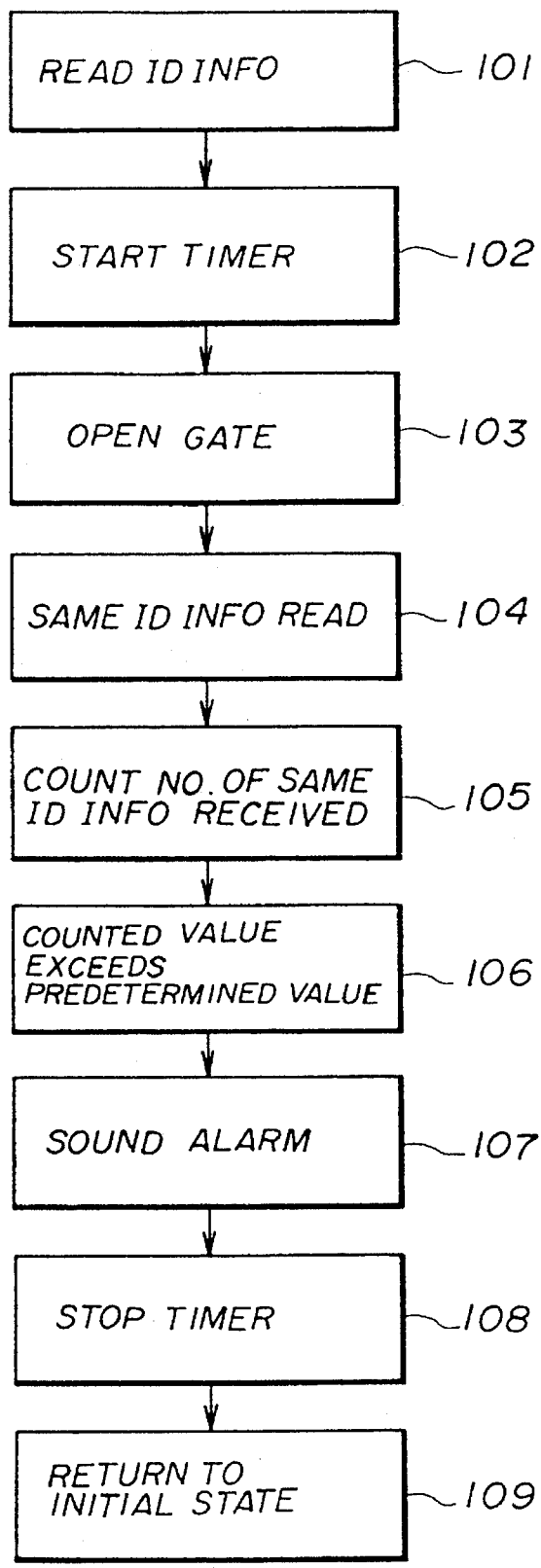
FIG. 7 is a flow chart for explaining the operation of the external unit.

Next, a description will be given of the operation of the external unit 2, by referring to FIG. 7. FIG. 7 is a flow chart for explaining the operation of the host computer 33.

First, it is assumed for the sake of convenience that the card holder 3 carrying the ID card 1 stands near the gate 2—2 for a relatively long time when passing through the gate 2—2. In this case, the command from the external unit 2 is transmitted to the IC card 1 via the antenna 31 a plurality of times, and the IC card 1 continues to operate by the power supplied from the battery 16. In addition, the IC card 1 responds to the command by transmitting the ID information stored in the memory 14 to the external unit 2 via the non-contact type communication part 13.

The ID information received by the antenna 31 of the external unit 2 is read into the host computer 33 via the transmitter/receiver 32 in a step 101 shown in FIG. 7, and the timer 34 is started in a step 102. The host computer 33 judges whether or not the ID information received via the transmitter/receiver 32 matches the ID information registered in the memory 37, and opens the gate 2—2 in a step 103 if the two collated ID information match.

The same ID information is read into the host computer 33 via the transmitter/receiver 32 in a step 104, and the host computer 33 starts the counter 35 to count the number of times the same ID information is received in a step 105. In addition, if the counted value of the counter 35 exceeds a predetermined value in a step 106, the host computer 33 supplies an alarm signal to the speaker 35 in a step 107 and an alarm sound is sounded from the speaker 36.

Therefore, the card holder 3 can recognize from the alarm sound that the external unit 2 has read the same ID information a plurality of times. The card holder 3 will most likely move away from the gate 2—2 when he hears the alarm sound, and it is thus possible to prevent premature wear of the battery 16 of the IC card 1.

The host computer 33 stops the timer 34 in a step 108 after a predetermined time elapses from the time when the host computer 33 receives the same ID information for the first time. If the same ID information is received for over this predetermined time timed, the host computer 33 may disregard the same ID information and accordingly stop the alarm sound. Then, the host computer 33 returns to its initial state in a step 109. If the same ID information is not read into the host computer 33, the timer 34 simply stops after the predetermined time.

The warning means 36 in this embodiment is the speaker 36, but the warning means 36 is not limited to such. For example, a warning lamp may be provided on the terminal equipment 2-1 in FIG. 2, and visually warn the card holder 3 by turning ON or flashing the warning lamp. In this case, it is possible to take measures so that the warning lamp flashes when the same ID information is successively received by the external unit 2 two or more times. Furthermore, it is possible to display warning information on a display of the terminal equipment 2-1. Moreover, the warning may be given to the card holder 3 by other means, including a voice guidance output from the speaker 36.

In the above described embodiment, the open gate 2—2 is closed automatically after the card holder 3 passes through the gate 2—2. This may be simply achieved by a known means such as providing a sensor or the like at or beyond the gate 2—2 and closing the gate 2—2 in response to an output signal of the sensor or the like. On the other hand, the gate 2—2 is opened even if the card holder 3 simply stands near the gate 2—2, and in this case, the card holder 3 may not pass through the gate 2—2. Hence, it is desirable to automatically close the gate 2—2 if the card holder 3 does not pass through the open gate 2—2. For example, the timer 34 may be used to automatically close the gate 2—2 in such a case. In other words, the host computer 33 may automatically close the gate 2—2 after a predetermined time timed by the timer 34 by returning to the initial state in the step 109 shown in FIG. 7, regardless of whether or not the card holder 3 passes through the open gate 2—2. The predetermined time used in this case may of course be different from the predetermined time used to automatically cut off the alarm. Preferably, the predetermined time used to automatically close the gate 2—2 is timed from the time when the gate 2—2 is opened in the step 103.

Further, the present invention is not limited to these embodiments, but various variations and modifications may be made without departing from the scope of the present invention.

What is claimed is:

1. An admission managing system for admitting a card holder of an integrated circuit card which has operating means, including a battery, for operating the integrated circuit card, means for receiving an external command to activate said operating means, a memory storing identification information, and means for at least communicating in a non-contact manner including reception of the command and transmission of the identification information, said admission managing system comprising:

a gate admitting the card holder of the integrated circuit card when opened;

first means for transmitting the external command to the integrated circuit card to activate said operating means and for receiving the identification information received from the integrated circuit card in response to the command;

second means, coupled to said first means, for storing identification information of authorized card holders to be admitted;

third means, coupled to said first and second means and to said gate, for comparing the identification information received from the integrated circuit card with identification information of each authorized card holder stored in said second means and opening said gate when the identification information received by said first means from the integrated circuit card is identical to one of the identification information stored in said second means; and fourth means, coupled to said first and third means, for determining number of times the same identification information is received by said third means from said first means and outputting a warning to the card holder if the number of times the same identification information is consecutively received by said first means from the integrated circuit card exceeds a predetermined value so as to avoid repeated transmission of the identification information from the integrated circuit card exceeding a certain time, so that an unnecessary power consumption of the battery of said operating means of the integrated circuit card is prevented.

2. The admission managing system as claimed in claim 1, wherein the communication between said first means and the integrated circuit card uses a medium which is selected from a group consisting of electromagnetic waves, high-frequency waves, radio frequency waves, light and electrostatic coupling.

3. The admission managing system as claimed in claim 1, wherein said fourth means includes indicating means for visually warning the card holder.

4. The admission managing system as claimed in claim 1, wherein said fourth means includes means for warning the card holder by sound.

5. The admission managing system as claimed in claim 1, wherein said fourth means includes counter means for counting the number of times the same identification information is received by said first means from the integrated circuit card, and means for judging whether or not the number of times counted by said counter means exceeds the predetermined value.

6. The admission managing system as claimed in claim 1, wherein said fourth means includes timer means for timing a predetermined time from a time when the identification information is first received by said first means from the integrated circuit card, and means for disregarding the same ID information received by said first means if the same ID information is received for over the predetermined time.

7. The admission managing system as claimed in claim 6, wherein said fourth means includes means for stopping the output of the warning if said first means receives the same ID information for over the predetermined time timed by said timer means.

8. The admission managing system as claimed in claim 1, wherein said fourth means includes timer means for timing a predetermined time from a time when the identification information is first received by said first means from the integrated circuit card, and means for controlling said third means to automatically close said gate after the predetermined time is timed by said timer means.

9. The admission managing system as claimed in claim 1, wherein said fourth means includes timer means for timing a predetermined time from a time when said third means opens said gate, and means for controlling said third means to automatically close said gate after the predetermined time is timed by said timer means.

10. An admission managing system for admitting a card holder of an integrated circuit card which has operating means, including a battery, for operating the integrated circuit card, means for receiving an external command to activate said operating means, a memory storing identification information, and means for at least communicating in a non-contact manner including reception of the command and transmission of the identification information, said admission managing system comprising:

first means for transmitting the external command to the integrated circuit card to activate said operating means and for receiving the identification information received from the integrated circuit card in response to the command;

second means, coupled to said first means, for storing identification information of authorized card holders to be admitted;

third means, coupled to said first and second means and to said gate, for comparing the identification information received from the integrated circuit card with identification information of each authorized card holder stored in said second means; and fourth means, coupled to said first and third means, for determining a number of times the same identification information is consecutively received by said third means from said first means and outputting a warning to the card holder if the number of times the same identification information is consecutively received by said first means from the integrated circuit card exceeds a predetermined value so as to avoid repeated transmission of the identification information from the integrated circuit card exceeding a certain time, so that an unnecessary power consumption of the battery of said operating means of the integrated circuit card is prevented.

* * * * *